United States Patent
Djafarian et al.

(10) Patent No.: US 6,681,319 B1
(45) Date of Patent: Jan. 20, 2004

(54) DUAL ACCESS INSTRUCTION AND COMPOUND MEMORY ACCESS INSTRUCTION WITH COMPATIBLE ADDRESS FIELDS

(75) Inventors: Karim Djafarian, Vence (FR); Gilbert Laurenti, Saint Paul de Vence (FR); Herve Catan, Saint Laurent du Var (FR); Vincent Gillet, Le Rouret (FR)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/410,653

(22) Filed: Oct. 1, 1999

(30) Foreign Application Priority Data

Oct. 6, 1998 (EP) .............................. 98402455
Oct. 6, 1998 (EP) .............................. 98402456

(51) Int. Cl.[7] ................................. G06F 9/30
(52) U.S. Cl. ..................... 712/208; 712/205; 712/204
(58) Field of Search ............................... 712/213, 212, 712/206, 215

(56) References Cited

U.S. PATENT DOCUMENTS

| | | | | |
|---|---|---|---|---|
| 4,439,828 A | * | 3/1984 | Martin ....................... | 712/226 |
| 4,945,511 A | * | 7/1990 | Itomitsu et al. .............. | 712/212 |
| 5,163,139 A | * | 11/1992 | Haigh et al. ................. | 712/203 |
| 5,303,356 A | * | 4/1994 | Vassiliadis et al. ......... | 711/125 |
| 5,335,330 A | * | 8/1994 | Inoue ......................... | 712/206 |
| 5,442,762 A | * | 8/1995 | Kato et al. .................. | 712/206 |
| 5,721,854 A | * | 2/1998 | Ebcioglu et al. ............. | 712/203 |
| 5,732,234 A | * | 3/1998 | Vassiliadis et al. ......... | 712/200 |
| 6,363,470 B1 | * | 3/2002 | Laurenti et al. ............. | 711/220 |
| 6,487,576 B1 | * | 11/2002 | Giacalone et al. ........... | 708/525 |
| 6,499,098 B1 | * | 12/2002 | Laurenti ..................... | 712/209 |
| 6,502,152 B1 | * | 12/2002 | Laurenti ..................... | 710/264 |
| 6,507,921 B1 | * | 1/2003 | Buser et al. ................. | 714/45 |
| 6,516,408 B1 | * | 2/2003 | Abiko et al. ................ | 712/227 |
| 6,557,097 B1 | * | 4/2003 | Clave et al. ................ | 712/222 |
| 6,571,268 B1 | * | 5/2003 | Giacalone et al. ........... | 708/524 |
| 6,598,151 B1 | * | 7/2003 | Laurenti et al. ............. | 712/228 |

FOREIGN PATENT DOCUMENTS

| | | |
|---|---|---|
| EP | 0 354 740 A | 2/1990 |
| EP | 0 426 393 A2 | 5/1991 |
| EP | 0 498 067 A2 | 8/1992 |

\* cited by examiner

*Primary Examiner*—Kakali Chaki
*Assistant Examiner*—William H. Wood
(74) *Attorney, Agent, or Firm*—Robert D. Marshall, Jr.; W. James Brady, III; Frederick J. Telecky, Jr.

(57) ABSTRACT

A processing engine 10 includes an instruction buffer 502 operable to buffer single and compound instructions pending execution. A decode mechanism is configured to decode instructions from the instruction buffer. The decode mechanism is arranged to respond to a predetermined tag in a tag field of an instruction, which predetermined tag is representative of the instruction being a compound instruction formed from separate programmed memory instructions. The decode mechanism is operable in response to the predetermined tag to decode at least first data flow control for a first programmed instruction and second data flow control for a second programmed instruction. The use of compound instructions enables effective use of the bandwidth available within the processing engine. A soft dual memory instruction can be compiled from separate first and second programmed memory instructions. A compound address field of the predetermined compound instruction can be arranged at the same bit positions as the address field for a hard compound memory instruction, that is a compound instruction which is programmed. In this case the decoding of the addresses can be started before the operation code of the instructions have been decoded. To reduce the number of bits in the compound instruction, addressing can be restricted to indirect addressing and the operation codes for at least the first instruction can be reduced in size. In this way, the compound instruction can be arranged to have the same number of bits in total as the sum of the bits of the separate programmed instructions.

29 Claims, 14 Drawing Sheets

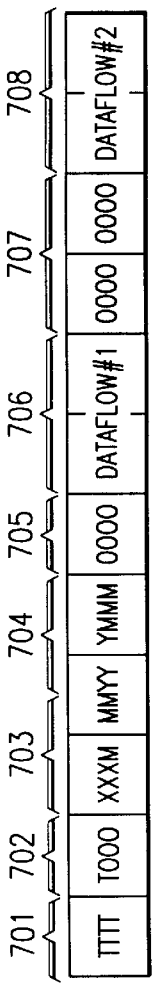

FIG. 8

| INSTRUCTION #1 | INSTRUCTION #2 | EXAMPLE | PARALLELISM |
|---|---|---|---|
| SINGLE MEMORY | REGISTER | ACy = rnd (ACy + (Smem *ACx))<br>\|\| dst = dst + src | // ENABLE |
| SINGLE MEMORY | CONTROL | ACy = rnd (ACy + (Smem *ACx))<br>\|\| repeat (k8) | // ENABLE |
| SINGLE MEMORY | STACK | ACy = rnd (ACy + (Smem *ACx))<br>\|\| push (src) | // ENABLE |
| SINGLE MEMORY | SINGLE MEMORY | ACx = rnd (DRx *Xmem)<br>\|\| ACy = Ymem | // SOFT DUAL |
| DUAL MEMORY | REGISTER | ACx = (Xmem <<#16) + (Ymem <<#16)<br>\|\| DRy = DRx & k8 | // ENABLE |
| DUAL MEMORY | CONTROL | dbl (Ymem) = dbl (Xmem)<br>\|\| goto L8 | // ENABLE |
| DUAL MEMORY | STACK | ACy = rnd (ACy + Smem *ACx))<br>\|\| push (src1 src2) | // ENABLE |
|  |  |  |  |

FIG. 10

| 701 | 702 | 703 | 704 | 705 | 706 | 707 | 708 |
|---|---|---|---|---|---|---|---|
| TTTT | T000 | XXXM | MMYY | YMMM | 0000 | DATAFLOW#1 | 0000 | 0000 | DATAFLOW#2 |

FIG. 9

| Operation | P1 | P2 | P3 | P4 | | P5 | P6 | |
|---|---|---|---|---|---|---|---|---|
| Single read | P1 | P2 | P3 | P4 | D | | P6 | |
| Single write | P1 | P2 | P3 | P4 | | P5 | E | |
| Single write/shift | P1 | P2 | P3 | P4 | | P5 | shift | F |
| Dual read | P1 | P2 | P3 | C | D | | P6 | |
| Stack read (32 bit) | P1 | P2 | P3 | C | D | | P6 | |
| Double read | P1 | P2 | P3 | P4 | | | P6 | |
| Dual write | P1 | P2 | P3 | P4 | C,D | P5 | E | F |
| Stack Write (32 bit) | P1 | P2 | P3 | P4 | | P5 | E | F |
| Double write | P1 | P2 | P3 | P4 | | P5 | E,F | |
| Read/modify/write | P1 | P2 | P3 | P4 | D | | modify | E |
| Dual read & coeff | P1 | P2 | P3 | C | B,D | | P6 | |
| Double read/write | P1 | P2 | P3 | P4 | C,D | | E,F | |
| Duel read/write | P1 | P2 | P3 | P4 | D | | E | |
| Duel read/write/shift | P1 | P2 | P3 | C | | | shift | F |
| Double read/dual shift | P1 | P2 | P3 | P4 | | P5 | shift | E,F |

FIG. 15

| DAGEN #1 | DAGEN #2 | soft dual DAGEN | Operand #1 standalone fetch | Operand #2 standalone fetch | Operand #1 soft dual fetch | Operand #2 soft dual fetch |
|---|---|---|---|---|---|---|
| Smem_R | Smem_R | Dual_RR | DB | DB | DB | CB |
| Smem_R | Smem_W | Dual_RW | DB | – | DB | – |
| Smem_R | Smem_WF | Dual_RWF | DB | – | DB | – |
| Smem_R | Lmem_W | Dual_RW | CB, DB | – | CB, DB | – |
| Smem_R | Lmem_WF | Dual_RWF | CB, DB | – | CB, DB | – |

1500

DUAL ACCESS INSTRUCTION AND COMPOUND MEMORY ACCESS INSTRUCTION WITH COMPATIBLE ADDRESS FIELDS

This application claims priority to S.N. 98402456.2, filed in Europe on Oct. 6, 1998 (TI-27685EU) and S.N. 98402455.4, filed in Europe on Oct. 6, 1998 (TI-28433EU).

FIELD OF THE INVENTION

The present invention relates to processing engines, and to the parallel execution of instructions in such processing engines.

BACKGROUND OF THE INVENTION

It is known to provide for parallel execution of instructions in microprocessors using multiple instruction execution units. Many different architectures are known to provide for such parallel execution. Providing parallel execution increases the overall processing speed. Typically, multiple instructions are provided in parallel in an instruction buffer and these are then decoded in parallel and are dispatched to the execution units. Microprocessors are general purpose processing engines which require high instruction throughputs in order to execute software running thereon, which can have a wide range of processing requirements depending on the particular software applications involved. Moreover, in order to support parallelism, complex operating systems have been necessary to control the scheduling of the instructions for parallel execution.

Many different types of processing engines are known, of which microprocessors are but one example. For example, Digital Signal Processors (DSPs) are widely used, in particular for specific applications. DSPs are typically configured to optimize the performance of the applications concerned and to achieve this they employ more specialized execution units and instruction sets.

The present invention is directed to improving the performance of processing engines such as for example, but not exclusively, digital signal processors.

SUMMERY OF THE INVENTION

Particular and preferred aspects of the invention are set out in the accompanying independent and dependent claims. Combinations of features from the dependent claims may be combined with features of the independent claims as appropriate and not merely as explicitly set out in the claims.

In accordance with a first aspect of the invention, there is provided a processing engine comprising an instruction buffer operable to buffer single and compound instructions pending execution thereof, and a decode mechanism configured to decode instructions from the instruction buffer. The decode mechanism is configured to be responsive to a predetermined tag in a tag field of an instruction, which predetermined tag is representative of the instruction being a compound instruction formed from separate programmed memory instructions. The decode mechanism is operable in response to the predetermined tag to decode at least a first data flow control for a first programmed instruction and a second data flow control for a second programmed instruction.

Thus, an embodiment of the invention provides a decode mechanism responsive to compound instructions formed (e.g., assembled or compiled) by combining separate programmed instructions. In this manner, it is possible to optimize the use of the bandwidth available within the processing engine. Appropriate programmed instructions, such as suitable memory instructions, can thus be assembled, or compiled, to form a compound instruction. By generating a separate control flow for each of the constituent programmed instructions from the compound instruction, those instructions can be performed wholly or partially in parallel with a positive effect on the overall throughput of the processing engine. The control flow generated by the decode mechanism for each of the programmed instructions can be the same as that which would have been generated for the programmed instructions if they had been held as single instructions in the instruction buffer.

A compact and efficient encoding can be enabled in an embodiment of the invention. For example by ensuring that a memory instruction can only be a first of a pair of instructions in the instruction buffer in the form of a predetermined compound instruction, parallelism of memory access instructions can be provided with efficient encoding, efficient use of real estate and reduced power consumption.

In an embodiment of the invention, the compound instruction is defined as a soft compound memory instruction formed by combining (e.g. using an instruction preprocessing mechanism such as a compiler or an assembler) from separate programmed memory instructions. In a particular example, the compound instruction is a soft dual memory instruction, that is a dual memory instruction assembled from separate first and second programmed memory instructions, although in other examples more than two instructions can be assembled into a compound instruction.

Preferably, the decode mechanism is operable to decode a first memory address for a first programmed memory address instruction and a second memory address for a second programmed memory instruction from a compound memory address field in the compound instruction. Particularly, where the compound address field of the compound instruction is at the same bit positions as the address field for a hard programmed dual memory instruction, this can have a positive effect on instruction throughput. In this case the decoding of the addresses can be started before the operation code of the instructions have been decoded regardless of the format of first and second instructions of a dual instruction.

In order to reduce the number of bits required for the compound instruction, the memory addresses in the compound address field of the compound instruction can be arranged to be indirect addresses, whereby the decode mechanism needs only to be operable to decode indirect addresses for such instructions. As dual instructions support less options than single instructions, the size of a post modification field for the addresses can be reduced, thereby reducing the number of bits required for the addresses themselves and also to dispense with an indirect/direct indicator bit.

A memory access instruction can be constrained to be a first instruction of a pair of instructions in the instruction buffer. In this case a soft dual instruction effectively provides an encoding corresponding to two memory instructions. As a result, the need for a parallel enable field can be avoided, any memory instruction being implicitly capable of parallelism. This also provides further advantages of providing a reduction of an application code size, with optimization of external interface bandwidth and a reduction of cache misses.

The decoder for the second instruction of an instruction pair can also be made as a subset of the decoder for the first instruction resulting in a reduction in the integrated circuit real estate required and a reduction in power consumption for the processing engine.

In order to provide a compact instruction format and to enable the address field to be located at the same position as for a hard compound instruction, the compound instruction can comprise a split operation code field for a first instruction of the predetermined compound instruction. The operation code can be spilt either side of the address field, for example. The decoder can be response to detection of the appropriate tag field to decode the split operation code for the first instruction of the compound instruction.

In order to further reduce the number of bits, the compound instruction can comprise a reduced operation code field for at least the first instruction of the predetermined compound instruction such that the operation code field comprises fewer bits that the operation code field of the first programmed instruction. By restricting the range of operation codes for memory instructions to be within a certain range or ranges, the number of bits which need to be provided for the first operation code can be reduced. The decode mechanism can be arranged to be responsive to the predetermined tag to decode a reduced size operation code for the first instruction of the compound instruction.

With the various measures mentioned above, the predetermined compound instruction can be arranged to have the same number of bits in total as the sum of the bits of the separate programmed instructions. Reorganization of the fields from the programmed instructions can lead to the predetermined compound instruction having a common overall format with other instructions.

Where each programmed instruction has a data address generation (DAGEN) code field, the individual DAGEN codes of the individual programmed instructions could be combined into a combined DAGEN code field within the compound instruction. This could provide more rapid decoding and execution of the compound instruction. The combined DAGEN code field could form part of a combined address field. Where a combined DAGEN code field is provided, the decode mechanism can be operable to respond to a predetermined DAGEN tag to decode the combined DAGEN field.

The processing engine can be provided with a data fetch controller operable to fetch, in parallel, first and second operands from addresses identified by the first and second memory addresses, respectively. A data write controller can also be operable to write in parallel the result of first and second data flow operations for the first and second instructions, respectively. Also, dual read/write operations can be provided.

In an embodiment of the invention, assembler syntax can differentiate between hard compound and soft compound syntax to provide visibility for available slots for parallelism. A hard compound instruction can be executed in parallel with a non-memory instruction such as a control flow or register instruction as indicated by a parallel enable bit and as long as there are no bus/operator resource conflicts.

In accordance with another aspect of the invention, there is provided a processor, for example, but not necessarily, a digital signal processor, comprising a processing engine as described above. The processor can be implemented as an integrated circuit, for example as an Application Specific Integrated Circuit (ASIC).

A digital signal processing system comprising a processing engine as described above can also be provided with an instruction preprocessing mechanism operable to combine separate programmed memory instructions to form a compound memory instruction. The instruction preprocessor can be in the form of a compiler, assembler, etc., which is operable to compile or assemble compound instructions from programmed instructions. The mechanism can be configured to be operable to determine whether the separate programmed memory instructions may be combined prior to assembly of the compound instruction.

In accordance with a further aspect of the invention, there is provided an instruction preprocessor for a digital signal processing system, the instruction preprocessor being configured to be operable:

to determine programmed memory instructions capable of being combined; and to assemble a compound memory instruction from said determined programmed memory instructions.

It should be understood that in the present context the term "instruction preprocessor" is to be understood broadly to cover any mechanism for preprocessing instructions, that is compiling and/or assembling instructions, including compilers, assemblers, etc.

The instruction preprocessor may be provided separately, for example on a carrier medium such as a data storage medium (a disc, solid state memory, a data transmission medium such as an electrical, optical or other electromagnetic (e.g. wireless transmission medium)).

In accordance with another aspect of the invention, there is provided a method of improving the performance of a processing engine. The method includes:

buffering a compound instruction assembled from separate programmed memory instructions, the compound instruction including a tag field containing a predetermined compound instruction tag; and responding to the predetermined compound instruction tag in the tag field of an instruction in the instruction buffer to decode, from the compound instruction, at least first data flow control for a first programmed instruction and second data flow control for a second programmed instruction.

BRIEF DESCRIPTION OF THE DRAWINGS

Particular embodiments in accordance with the invention will now be described, by way of example only, and with reference to the accompanying drawings in which like reference signs are used to denote like parts, unless otherwise stated, and in which:

FIG. 8 illustrates examples of instruction pairs;

FIG. 9 illustrates the relative timing of bus cycles for various instructions;

FIG. 10 illustrates an example of the execution of a soft dual instruction;

FIG. 15 is a table illustrating operand fetch control for a soft dual instruction.

DESCRIPTION OF PARTICULAR EMBODIMENTS

Although the invention finds particular application to Digital Signal Processors (DSPs), implemented for example in an Application Specific Integrated Circuit (ASIC), it also finds application to other forms of processing engines.

Figure 1:
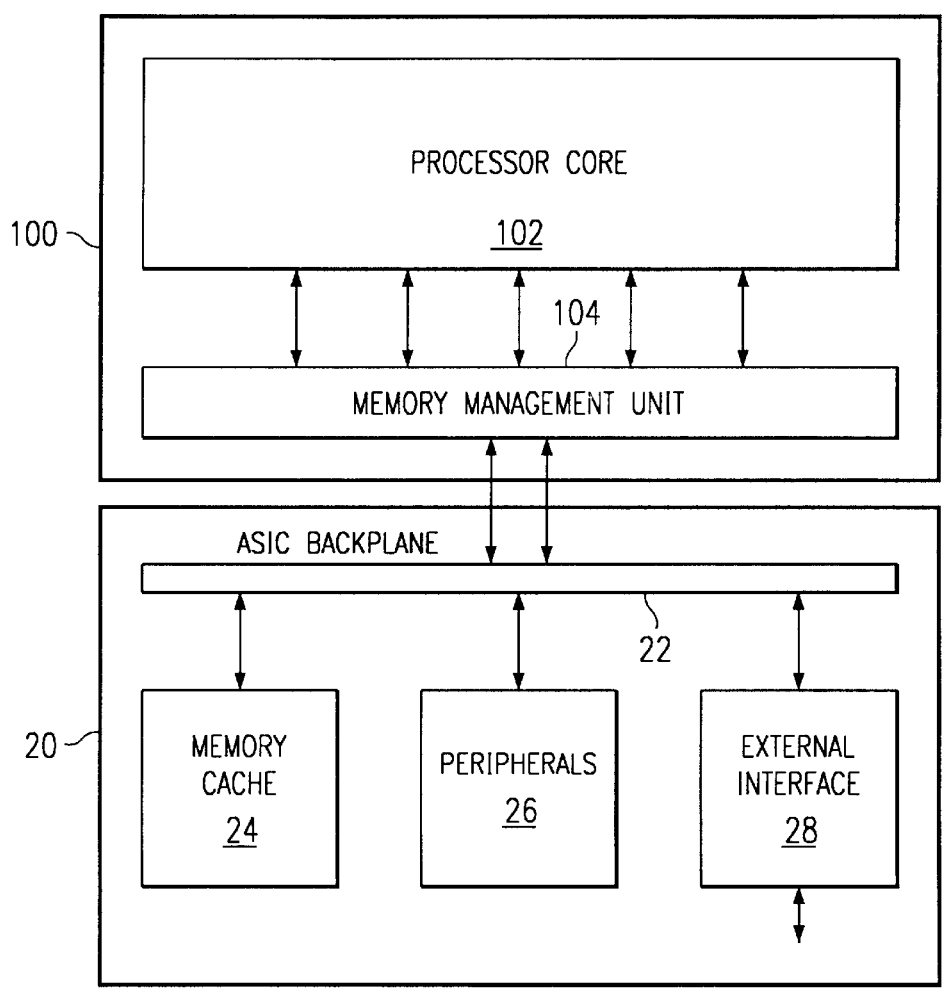
FIG. 1 is a schematic block diagram of a processor in accordance with an embodiment of the invention.

FIG. 1 is a block diagram of a microprocessor 10 which has an embodiment of the present invention. Microprocessor 10 is a digital signal processor ("DSP"). In the interest of clarity, FIG. 1 only shows those portions of microprocessor 10 that are relevant to an understanding of an embodiment of the present invention. Details of general construction for DSPs are well known, and may be found readily elsewhere. For example, U.S. Pat. No. 5,072,418 issued to Frederick Boutaud, et al, describes a DSP in detail and is incorporated herein by reference. U.S. Pat. No. 5,329,471 issued to Gary Swoboda, et al, describes in detail how to test and emulate a DSP and is incorporated herein by reference. Details of portions of microprocessor 10 relevant to an embodiment of the present invention are explained in sufficient detail hereinbelow, so as to enable one of ordinary skill in the microprocessor art to make and use the invention.

Several example systems which can benefit from aspects of the present invention are described in U.S. Pat. No. 5,072,418, which was incorporated by reference herein, particularly with reference to FIGS. 2–18 of U.S. Pat. No. 5,072,418. A microprocessor incorporating an aspect of the present invention to improve performance or reduce cost can be used to further improve the systems described in U.S. Pat. No. 5,072,418. Such systems include, but are not limited to, industrial process controls, automotive vehicle systems, motor controls, robotic control systems, satellite telecommunication systems, echo canceling systems, modems, video imaging systems, speech recognition systems, vocoder-modem systems with encryption, and such.

A description of various architectural features and a description of a complete set of instructions of the microprocessor of FIG. 1 is provided in co-assigned application Ser. No. 09/410,977 (TI-28433), which is incorporated herein by reference.

The basic architecture of an example of a processor according to the invention will now be described.

FIG. 1 is a schematic overview of a processor 10 forming an exemplary embodiment of the present invention. The processor 10 includes a processing engine 100 and a processor backplane 20. In the present embodiment, the processor is a Digital Signal Processor 10 implemented in an Application Specific Integrated Circuit (ASIC).

As shown in FIG. 1, the processing engine 100 forms a central processing unit (CPU) with a processing core 102 and a memory interface, or management, unit 104 for interfacing the processing core 102 with memory units external to the processor core 102.

The processor backplane 20 comprises a backplane bus 22, to which the memory management unit 104 of the processing engine is connected. Also connected to the backplane bus 22 is an instruction cache memory 24, peripheral devices 26 and an external interface 28.

It will be appreciated that in other embodiments, the invention could be implemented using different configurations and/or different technologies. For example, the processing engine 100 could form the processor 10, with the processor backplane 20 being separate therefrom. The processing engine 100 could, for example be a DSP separate from and mounted on a backplane 20 supporting a backplane bus 22, peripheral and external interfaces. The processing engine 100 could, for example, be a microprocessor rather than a DSP and could be implemented in technologies other than ASIC technology. The processing engine, or a processor including the processing engine, could be implemented in one or more integrated circuits.

Figure 2:
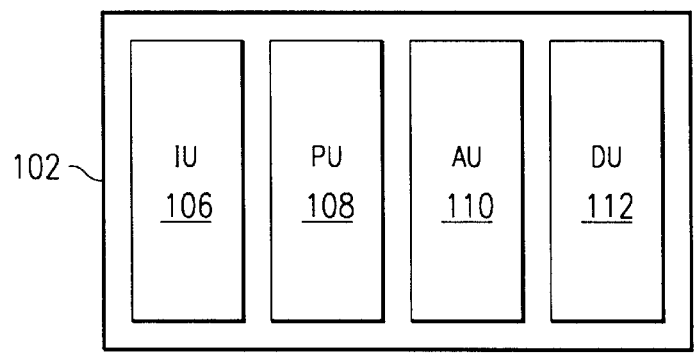
FIG. 2 is a schematic diagram of a core of the processor of FIG. 1.

FIG. 2 illustrates the basic structure of an embodiment of the processing core 102. As illustrated, the processing core 102 includes four elements, namely an Instruction Buffer Unit (I Unit) 106 and three execution units. The execution units are a Program Flow Unit (P Unit) 108, Address Data Flow Unit (A Unit) 110 and a Data Computation Unit (D Unit) 112 for executing instructions decoded from the Instruction Buffer Unit (I Unit) 106 and for controlling and monitoring program flow.

Figure 3:
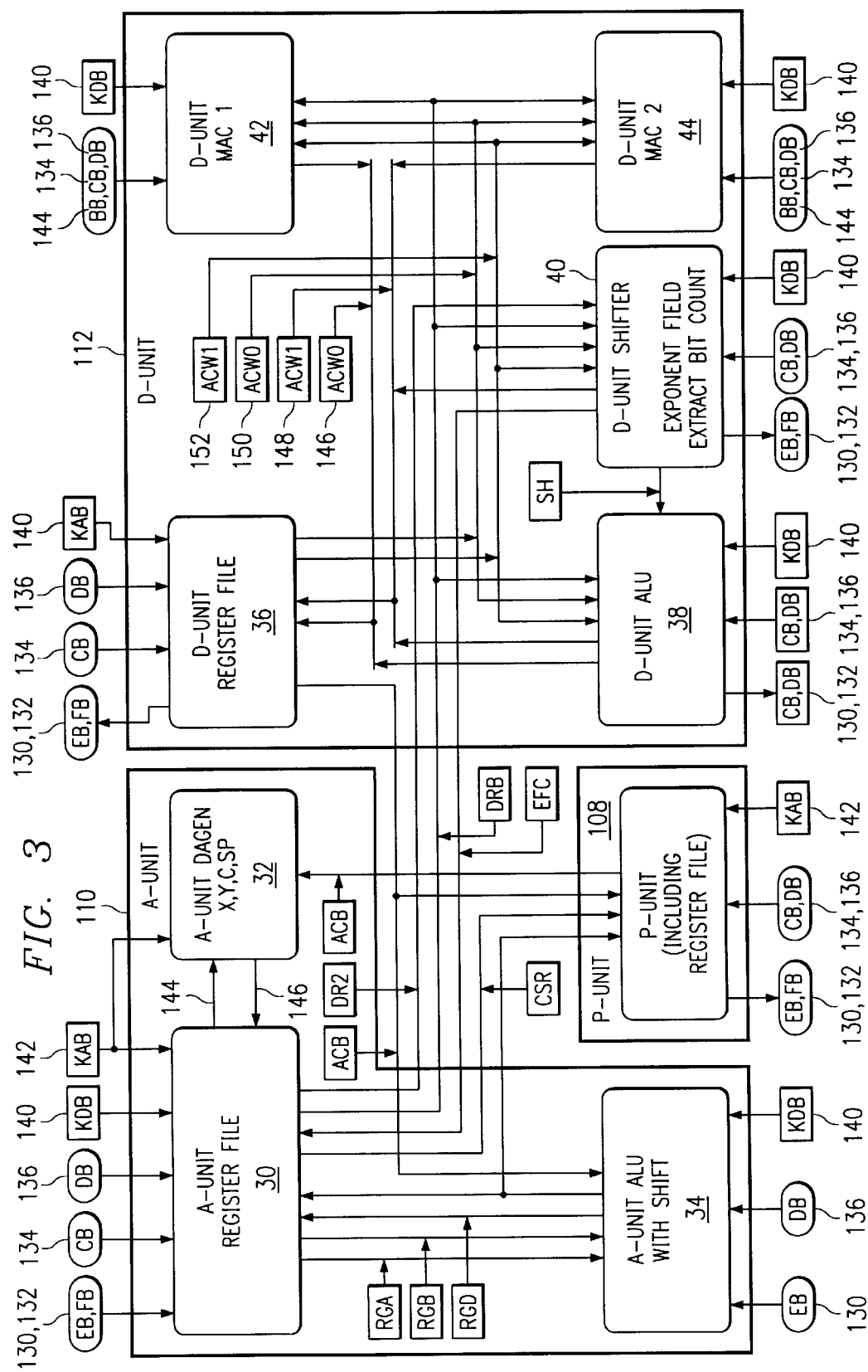
FIG. 3 is a more detailed schematic block diagram of various execution units of the core of the processor of FIG. 1.

FIG. 3 illustrates the P Unit 108, A Unit 110 and D Unit 112 of the processing core 102 in more detail and shows the bus structure connecting the various elements of the processing core 102. The P Unit 108 includes, for example, loop control circuitry, GoTo/Branch control circuitry and various registers for controlling and monitoring program flow such as repeat counter registers and interrupt mask, flag or vector registers. The P Unit 108 is coupled to general purpose Data Write busses (EB, FB) 130, 132, Data Read busses (CB, DB) 134, 136 and an address constant bus (KAB) 142. Additionally, the P Unit 108 is coupled to sub-units within the A Unit 110 and D Unit 112 via various busses labeled CSR, ACB and RGD.

As illustrated in FIG. 3, in the present embodiment the A Unit 110 includes a register file 30, a data address generation sub-unit (DAGEN) 32 and an Arithmetic and Logic Unit (ALU) 34. The A Unit register file 30 includes various registers, among which are 16 bit pointer registers (AR0–AR7) and data registers (DR0–DR3) which may also be used for data flow as well as address generation. Additionally, the register file includes 16 bit circular buffer registers and 7 bit data page registers. As well as the general purpose busses (EB, FB, CB, DB) 130, 132, 134, 136, a data constant bus 140 and address constant bus 142 are coupled to the A Unit register file 30. The A Unit register file 30 is coupled to the A Unit DAGEN unit 32 by unidirectional busses 144 and 146 respectively operating in opposite directions. The DAGEN unit 32 includes 16 bit X/Y registers and coefficient and stack pointer registers, for example for controlling and monitoring address generation within the processing engine 100.

The A Unit 110 also comprises the ALU 34 which includes a shifter function as well as the functions typically associated with an ALU such as addition, subtraction, and AND, OR and XOR logical operators. The ALU 34 is also coupled to the general-purpose busses (EB, DB) 130, 136 and an instruction constant data bus (KDB) 140. The A Unit ALU is coupled to the P Unit 108 by a PDA bus for receiving register content from the P Unit 108 register file. The ALU 34 is also coupled to the A Unit register file 30 by busses RGA and RGB for receiving address and data register contents and by a bus RGD for forwarding address and data registers in the register file 30.

As illustrated, the D Unit 112 includes a D Unit register file 36, a D Unit ALU 38, a D Unit shifter 40 and two multiply and accumulate units (MAC1, MAC2) 42 and 44. The D Unit register file 36, D Unit ALU 38 and D Unit shifter 40 are coupled to busses (EB, FB, CB, DB and KDB) 130, 132, 134, 136 and 140, and the MAC units 42 and 44 are coupled to the busses (CB, DB, KDB) 134, 136, 140 and data read bus (BB) 144. The D Unit register file 36 includes 40-bit accumulators (AC0–AC3) and a 16-bit transition register. The D Unit 112 can also utilize the 16 bit pointer and data registers in the A Unit 110 as source or destination registers in addition to the 40-bit accumulators. The D Unit register file 36 receives data from the D Unit ALU 38 and MACs 1&2 42, 44 over accumulator write busses (ACW0, ACW1) 146, 148, and from the D Unit shifter 40 over accumulator write bus (ACW1) 148. Data is read from the D Unit register file accumulators to the D Unit ALU 38, D Unit shifter 40 and MACs 1&2 42, 44 over accumulator read busses (ACR0, ACR1) 150, 152. The D Unit ALU 38 and D Unit shifter 40 are also coupled to sub-units of the A Unit 108 via various busses labeled EFC, DRB, DR2 and ACB.

Figure 4:
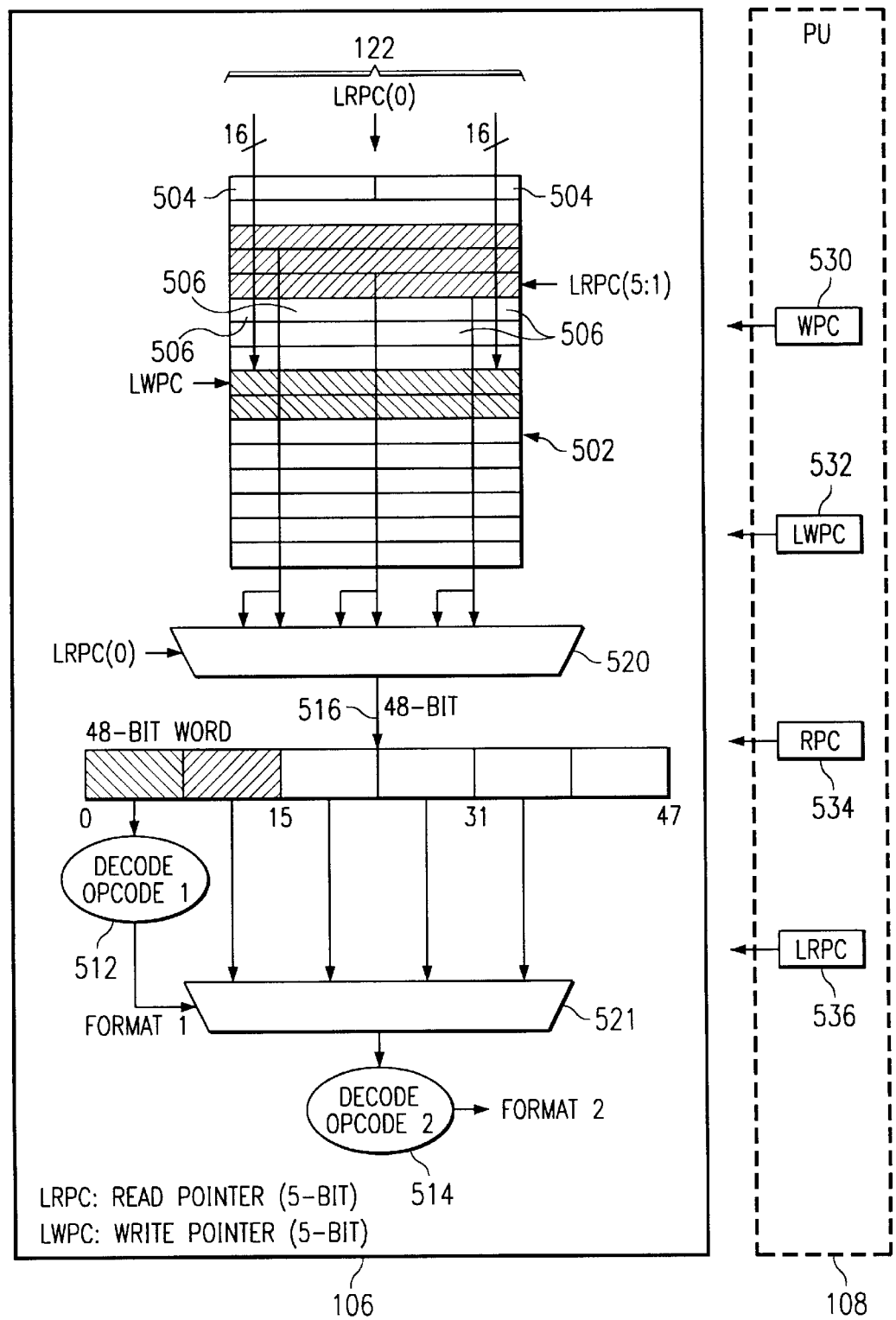
FIG. 4 is a schematic diagram of an instruction buffer queue and an instruction decoder controller of the processor of FIG. 1.

Referring now to FIG. 4, there is illustrated an instruction buffer unit 106 comprising a 32 word instruction buffer queue (IBQ) 502. The IBQ 502 comprises 32×16 bit registers 504, logically divided into 8 bit bytes 506. Instructions arrive at the IBQ 502 via the 32-bit program bus (PB) 122. The instructions are fetched in a 32-bit cycle into the location pointed to by the Local Write Program Counter (LWPC) 532. The LWPC 532 is contained in a register located in the P Unit 108. The P Unit 108 also includes the Local Read Program Counter (LRPC) 536 register, and the Write Program Counter (WPC) 530 and Read Program Counter (RPC) 534 registers. LRPC 536 points to the location in the IBQ 502 of the next instruction or instructions to be loaded into the instruction decoder(s) 512 and 514. That is to say, the LRPC 534 points to the location in the IBQ 502 of the instruction currently being dispatched to the decoders 512, 514. The WPC points to the address in program memory of the start of the next 4 bytes of instruction code for the pipeline. For each fetch into the IBQ, the next 4 bytes from the program memory are fetched regardless of instruction boundaries. The RPC 534 points to the address in program memory of the instruction currently being dispatched to the decoder(s) 512 and 514.

The instructions are formed into a 48-bit word and are loaded into the instruction decoders 512, 514 over a 48-bit bus 516 via multiplexors 520 and 521. It will be apparent to a person of ordinary skill in the art that the instructions may be formed into words comprising other than 48-bits, and that the present invention is not limited to the specific embodiment described above.

The bus 516 can load a maximum of two instructions, one per decoder, during any one instruction cycle. The combination of instructions may be in any combination of formats, 8, 16, 24, 32, 40 and 48 bits, which will fit across the 48-bit bus. Decoder 1, 512, is loaded in preference to decoder 2, 514, if only one instruction can be loaded during a cycle. The respective instructions are then forwarded on to the respective function units in order to execute them and to access the data for which the instruction or operation is to be performed. Prior to being passed to the instruction decoders, the instructions are aligned on byte boundaries. The alignment is done based on the format derived for the previous instruction during decoding thereof. The multiplexing associated with the alignment of instructions with byte boundaries is performed in multiplexors 520 and 521.

The processor core 102 executes instructions through a 7 stage pipeline, the respective stages of which will now be described with reference to FIG. 5.

The first stage of the pipeline is a PRE-FETCH (P0) stage 202, during which stage a next program memory location is addressed by asserting an address on the address bus (PAB) 118 of a memory interface, or memory management unit 104.

In the next stage, FETCH (P1) stage 204, the program memory is read and the I Unit 106 is filled via the PB bus 122 from the memory management unit 104.

The PRE-FETCH and FETCH stages are separate from the rest of the pipeline stages in that the pipeline can be interrupted during the PRE-FETCH and FETCH stages to break the sequential program flow and point to other instructions in the program memory, for example for a Branch instruction.

The next instruction in the instruction buffer is then dispatched to the decoder/s 512/514 in the third stage, DECODE (P2) 206, where the instruction is decoded and dispatched to the execution unit for executing that instruction, for example to the P Unit 108, the A Unit 110 or the D Unit 112. The decode stage 206 includes decoding at least part of an instruction including a first part indicating the class of the instruction, a second part indicating the format of the instruction and a third part indicating an addressing mode for the instruction.

The next stage is an ADDRESS (P3) stage 208, in which the address of the data to be used in the instruction is computed, or a new program address is computed should the instruction require a program branch or jump. Respective computations take place in the A Unit 110 or the P Unit 108 respectively.

In an ACCESS (P4) stage 210 the address of a read operand is output and the memory operand, the address of which has been generated in a DAGEN X operator with an Xmem indirect addressing mode, is then READ from indirectly addressed X memory (Xmem).

The next stage of the pipeline is the READ (P5) stage 212 in which a memory operand, the address of which has been generated in a DAGEN Y operator with an Ymem indirect addressing mode or in a DAGEN C operator with coefficient addressing mode, is READ. The address of the memory location to which the result of the instruction is to be written is output.

In the case of dual access, read operands can also be generated in the Y path, and write operands in the X path.

Finally, there is an execution EXEC (P6) stage 214 in which the instruction is executed in either the A Unit 110 or the D Unit 112. The result is then stored in a data register or accumulator, or written to memory for Read/Modify/Write or store instructions. Additionally, shift operations are performed on data in accumulators during the EXEC stage.

Figure 6:
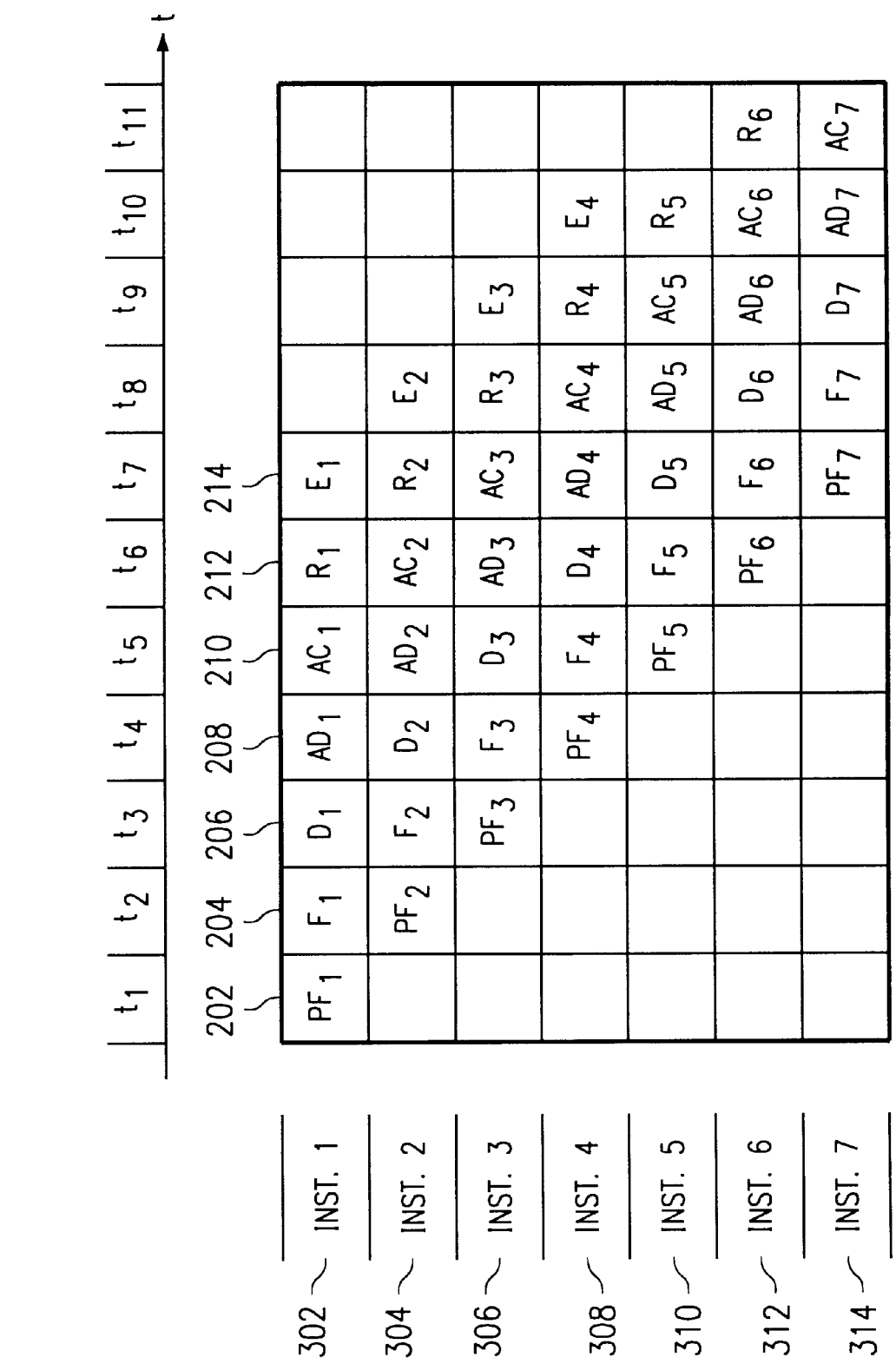
FIG. 6 is a diagrammatic illustration of an example of the operation of a pipeline in the processor of FIG. 1.
Figure 7:
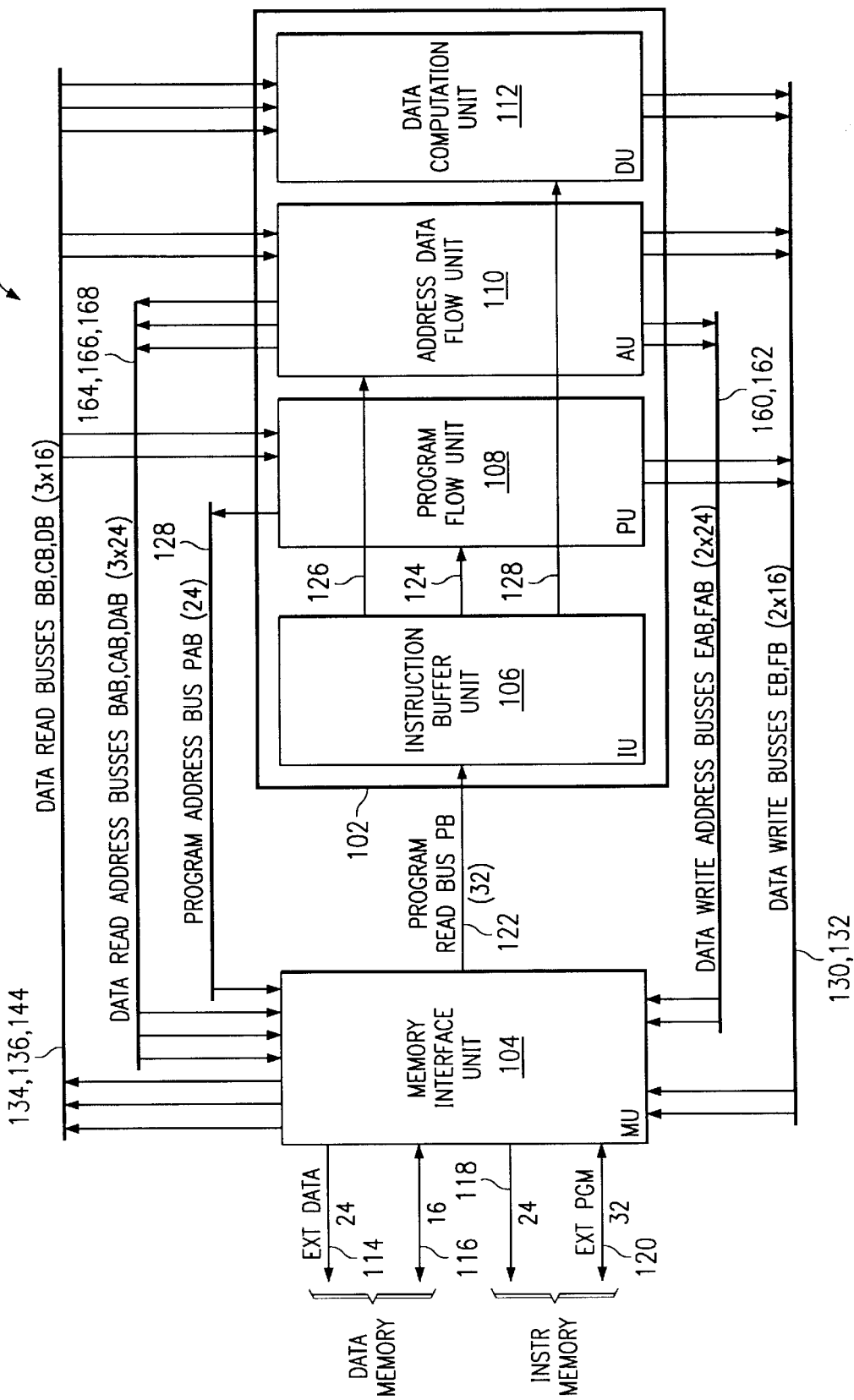
FIG. 7 is a schematic representation of the core of the processor for explaining the operation of the pipeline of the processor of FIG. 1.

The basic principle of operation for a pipeline processor will now be described with reference to FIG. 6. As can be seen from FIG. 6, for a first instruction 302, the successive pipeline stages take place over time periods $T_1$–$T_7$. Each time period is a clock cycle for the processor machine clock. A second instruction 304, can enter the pipeline in period $T_2$, since the previous instruction has now moved on to the next pipeline stage. For instruction 3, 306, the PRE-FETCH stage 202 occurs in time period $T_3$. As can be seen from FIG. 6. for a seven stage pipeline a total of 7 instructions may be processed simultaneously. For all 7 instructions 302, 304, 306, 308, 310, 312, 314, FIG. 6 shows them all under process in time period $T_7$. Such a structure adds a form of parallelism to the processing of instructions. As shown in FIG. 7, the present embodiment of the invention includes a memory management unit 104 which is coupled to external memory units (not shown) via a 24 bit address bus 114 and a bi-directional 16 bit data bus 116. Additionally, the memory management unit 104 is coupled to program storage memory (not shown) via a 24 bit address bus 118 and a 32 bit bi-directional data bus 120. The memory management unit 104 is also coupled to the I Unit 106 of the machine processor core 102 via a 32 bit program read bus (PB) 122. The P Unit 108, A Unit 110 and D Unit 112 are coupled to the memory management unit 104 via data read and data write busses and corresponding address busses. The P Unit 108 is further coupled to a program address bus 128.

More particularly, the P Unit 108 is coupled to the memory management unit 104 by a 24 bit program address bus 128, the two 16 bit data write busses (EB, FB) 130, 132, and the two 16 bit data read busses (CB, DB) 134, 136. The A Unit 110 is coupled to the memory management unit 104 via two 24 bit data write address busses (EAB, FAB) 160, 162, the two 16 bit data write busses (EB, FB) 130, 132, the three data read address busses (BAB, CAB, DAB) 164, 166, 168 and the two 16 bit data read busses (CB, DB) 134, 136. The D Unit 112 is coupled to the memory management unit 104 via the two data write busses (EB, FB) 130, 132 and three data read busses (BB, CB, DB) 144, 134, 136.

FIG. 7 represents the passing of instructions from the I Unit 106 to the P Unit 108 at 124, for forwarding branch instructions for example. Additionally, FIG. 7 represents the passing of data from the I Unit 106 to the A Unit 110 and the D Unit 112 at 126 and 128 respectively.

In a particular embodiment of the invention, the processing engine 100 is responsive to machine instructions in a number of formats. Examples of such instructions in different formats are illustrated in the following.

8 Bit instruction: OOOO OOOO

This represents an eight bit instruction, for example a memory map qualifier (MMAP( )) or a read port qualifier (readport( )). Such a qualifier comprises merely an eight bit opcode (OOOO OOOO). In such a case parallelism is implicit.

16 Bit Instruction: OOOO OOOE FSSS FDDD

This represents an example of a sixteen bit instruction, for example an instruction where the content of a destination register (e.g., dst) becomes the sum of the prior content of that register (dst) and the content of a source register (src), that is:

$$dst=dst+src$$

Such an instruction comprises a seven bit opcode (OOOO OOO) with a one bit parallel enable field (E), a four bit source register identifier (FSSS) and a four bit destination register identifier (FDDD).

16 Bit Instruction: OOOO FDDD PPPM MMMI

This represents another example of a sixteen bit instruction, for example where the content of a destination register (e.g., dst) becomes the content of a memory location (Smem), that is:

$$dst=Smem$$

Such an instruction comprises a four bit opcode (OOOO), a four bit destination register identifier (FDDD), a three bit pointer address (PPP), a four bit address modifier (MMMM) and a direct/indirect address indicator (I).

24 Bit Instruction: OOOO OOOE LLLL LLLL oCCC CCCC

This represents an example of a twenty four bit instruction, for example a conditional instruction for a branch to and offset (L8) where a condition is met, that is:

$$if(cond)\ goto\ L8$$

Such an instruction comprises a seven bit opcode (OOOO OOO) with a one bit parallel enable field (E), an eight bit branch offset (LLLL LLLL), a one bit opcode extension (o) and a seven bit condition field (CCC CCCC).

24 Bit Instruction: OOOO OOOO PPPM MMMI SSDD ooU%

This is another example of a twenty-four bit instruction, for example a single memory operand instruction where the content of an accumulator ($AC_y$) becomes the result of rounding the sum of the content of another accumulator ($AC_x$) and the square of the content of a memory location (with optional rounding), and optionally the content of a data register (DR3) can become the content of the memory location, that is:

$$AC_y=rnd(AC_x*Smem*Smem), DR3=Smem$$

Such an instruction comprises an eight bit opcode (OOOO OOOO), a three bit pointer address (PPP), a four bit address modifier (MMMM), a one bit direct/indirect address indicator field (I), a two bit source accumulator identifier (SS), a two bit destination accumulator identifier (DD), a two bit opcode extension (oo), an update condition field (u), and a one bit rounding option field (%).

32 Bit Instruction: OOOO OOOO PPPM MMMI KKKK KKKK KKKK KKKK

This is an example of a thirty-two bit instruction, for example an instruction where the content of a test register (TC1) is set to 1 or 0 depending on the sign comparison of a memory location (Smem) to a constant value (K16), that is:

$$TC1=(Smem==K16)$$

Such an instruction comprises an eight bit opcode (OOOO OOOO), a three bit pointer address (PPP), a four bit address modifier (MMMM), a one bit direct/indirect address indicator field (I) and a sixteen bit constant field (KKKK KKKK KKKK KKKK).

Hard Dual Instruction: OOOO OOOO XXXM MMYY YMMM SSDD ooox ssU%

This is an example of a 32 bit dual access instruction, which could be termed a "hard dual access instruction", or a hard programmed dual memory instruction, that is a dual instruction which has been programmed as such, for example, by a programmer. Such an instruction requires two DAGEN operators. A second instruction can be executed in parallel. This is typically a register or control instruction. Memory stack instructions can also be executed in parallel as long as there are no bus conflicts. An example of such an instruction is:

$C_y=rnd(DR_x*Xmem),$ $Ymem=HI(AC_x<<DR2)$ $DR3=Xmem$

This instruction comprises an eight bit opcode (OOOO OOOO), a three bit Xmem pointer address (XXX) with a four bit address modifier (MMMM), a three bit Ymem pointer address (YYY) with a four bit address modifier (MMMM), a two bit source accumulator ($AC_x$) identifier (SS), a two bit destination accumulator ($AC_y$) identifier (DD), a three bit opcode extension (ooo), a don't care bit (x), a two bit source accumulator identifier (ss), a one bit optional DR3 update field (U) and a one bit optional rounding field (%).

FIG. 8 is a table illustrating combinations of instructions forming instruction pairs and also a soft dual instruction. In such instruction pairs, the first instruction of the pair is always a memory operation. It will be noted that where the second instruction is also a memory instruction, then this is configured as a soft dual instruction, that is a compound instruction.

Instructions which may be located in a second position of an instruction pair (i.e. for the higher program address of the pair) include a parallel enable field (E bit) to indicate whether the instruction can be performed in parallel with the first of a pair of instructions. The parallel enable bit is located at a predetermined offset from the instruction format boundary between the instructions. The decoder is arranged to be responsive to the 'E' bit in order to control instruction execution.

The reason for having a memory operation first in an instruction pair is that at the entry to the address decode stage of the processor pipeline, the decoder does not know the format of the instruction, or even where the format boundary is located. Memory address decoding is one of the critical stages of the pipeline to ensure good instruction throughput. Accordingly, it is necessary to be able reliably to know the location and size of the address bits for a memory instruction to be decoded in order that the decoding can commence even before the exact nature of the instruction is determined.

A further advantage which results from constraining a memory instruction to be located as the first instruction in an instruction pair is that it is then not necessary for a memory instruction to include a field indicating whether parallel operation is permitted. This makes the instruction set more efficient and allows improved code size.

Yet a further advantage is that the hardware necessary for decoding a second instruction of an instruction pair need only be a subset of the hardware for decoding the first instruction of the instruction pair. The first instruction is the instruction of the instruction pair with a lower program address than the second instruction of the instruction pair. Thus, the decode hardware for the instruction with a higher program address of an instruction pair can be a subset of the decode hardware for the instruction with a lower program address of an instruction pair. This enables a reduction in the silicon area and power consumption required for implementing and operating the decode hardware.

Where two instructions of an instruction pair can be performed in parallel, this takes place in respective decoding and execution stages. However, due to physical bus timing constraints, bus transfers can be staggered.

FIG. 9 illustrates the pipeline stage in which memory access takes place for different types of instructions, including dual instructions. It should be noted, as for FIG. 4, that the pipeline stages shown are for illustrative purposes only. In practice, the prefetch and fetch stages form a flow separate from that of the remaining stages.

Figure 5:
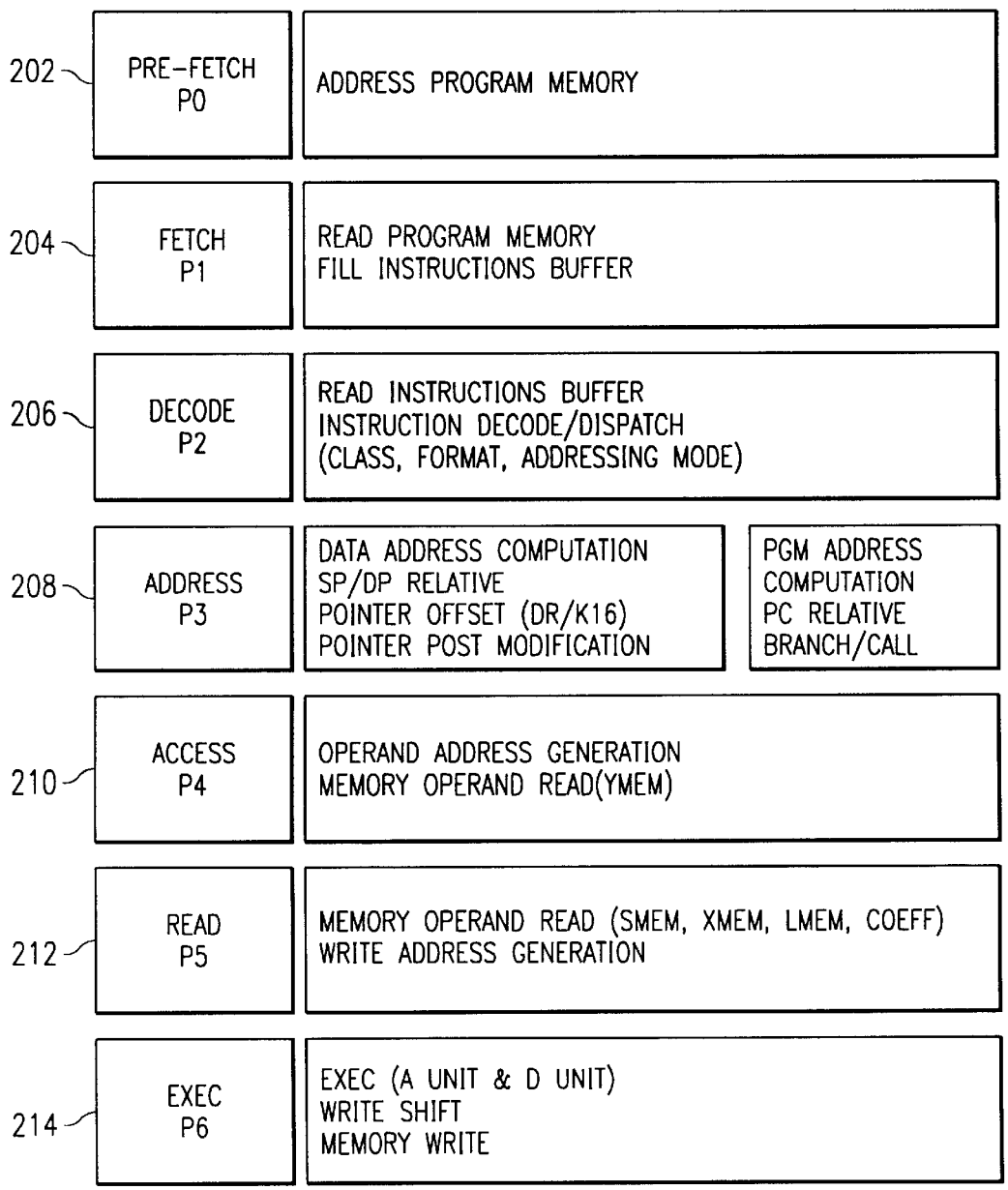
FIG. 5 is a representation of pipeline phases of the processor of FIG. 1.

Comparing FIG. 9 with FIG. 5, P1 represents the fetch stage, P2 the decode stage, P3 the address computation stage, P4 the access stage, P5 the read stage and P6 the execute stage. B represents a coefficient read access from a register via the B bus. C and D represent memory read accesses via the C and D busses respectively. E and F represent write accesses via the E and F busses respectively. In order that the read and write accesses can be performed at the required cycles without causing a bubble (or stall) on the pipeline, decoding is performed as early as possible.

FIG. 10 illustrates a particular form of dual memory access instruction. It is effectively formed from two merged programmed instructions which have implied parallelism. The dual memory instruction of FIG. 10 is termed a soft dual instruction, or also a compound instruction herein. It is formed by combining two programmed single memory access instructions in an instruction preprocessor, for example in a compiler or an assembler. In other words, this compound instruction is not programmed, or pre-programmed, as a dual instruction by a programmer. This provision of this form of compound instruction enables improved memory access performance by permitting parallel operation, with both instructions being executed in the same cycle. In a particular example described in the following, the soft dual instruction is restricted to indirect addressing with dual modifier options. As a result, it is possible to encode the soft dual instruction to achieve increased performance through parallel operation with no size penalty in respect of the combined instruction size.

The soft dual instruction is qualified by a five bit tag field 701, with individual following instruction fields organized as illustrated in FIG. 10. The size of the tag field results from constraints relating to the particular implementation, namely:

that the total encoding format is constrained not be greater than the sum of the encoding formats of the two constituent programmed instructions;

that the total instruction format size is a multiple of 8; and the availability of opcodes with respect to other single instructions.

Following the tag field 701 are:

part 702 of the operation code field for a first instruction;

a compound address field 703/704 including an indirect memory address (XXXMMM) 703 for the first instruction and an indirect memory address (YYYMMM) 704 for a second instruction;

the remainder of the operation code field 705 for the first instruction;

a data flow field 706 for the first instruction;

an operation code field 707 for the operation code of the second instruction; and a data flow field 708 for the second instruction.

It can be seen, therefore, that the combined address portion for the soft dual instruction is held at the same location in the soft dual instruction as for any other dual instruction. This provides the advantage of rapid address decoding as a result of being able to commence address decoding without knowledge of the instruction type involved. It will be seen that in order to achieve this, some reorganization of the bits in the soft dual instruction is necessary, for example as described above.

In addition to the modifications described above, where two programmed instructions each comprise a data address generation (DAGEN) field, these could be combined to form a combined DAGEN field in the soft dual instruction. The provision of a combined DAGEN field can facilitate and speed subsequent execution of the soft dual instruction.

Figure 11:
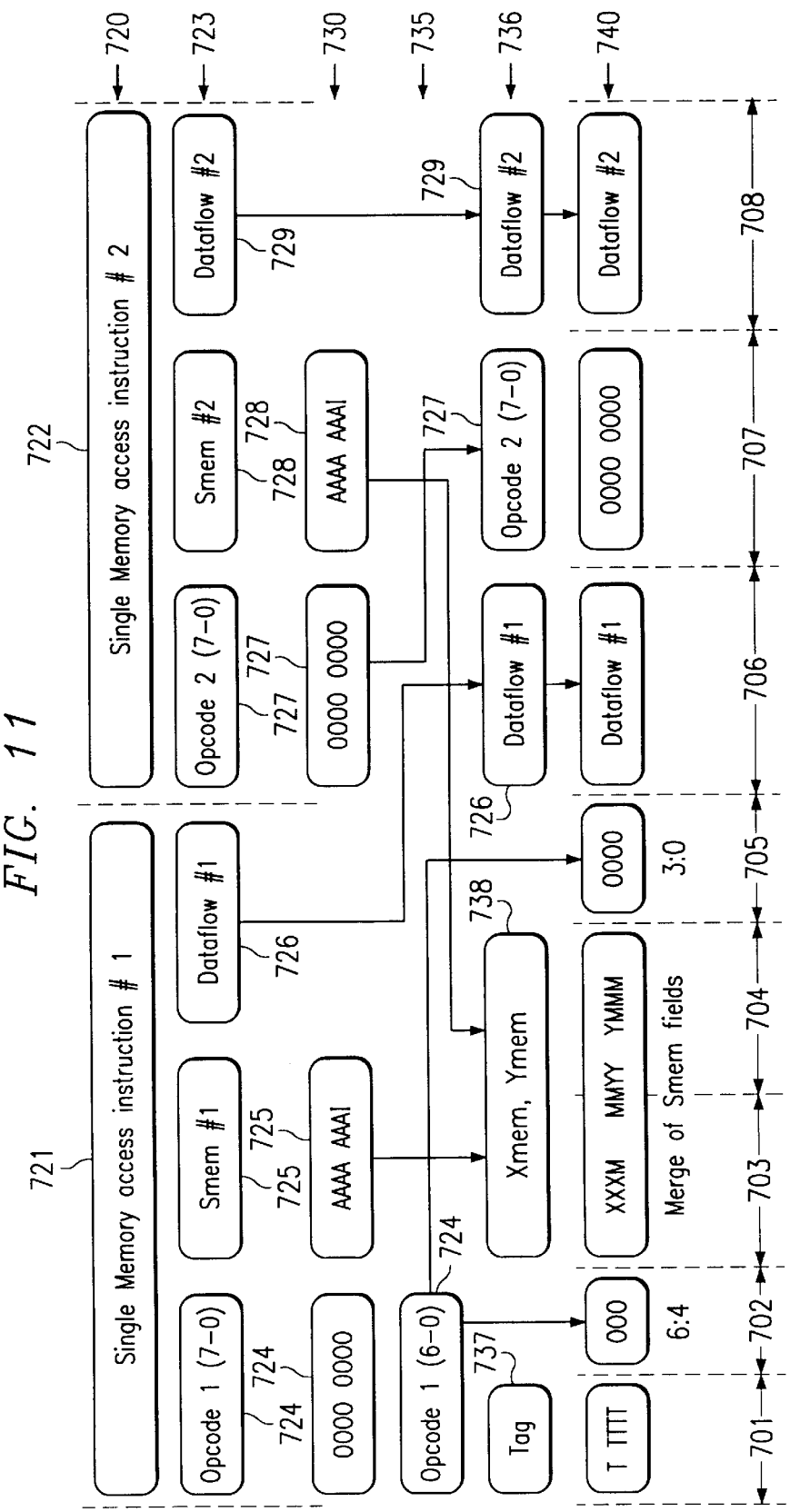
FIG. 11 is a schematic diagram illustrating the generation of a soft dual instruction.
Figure 12:
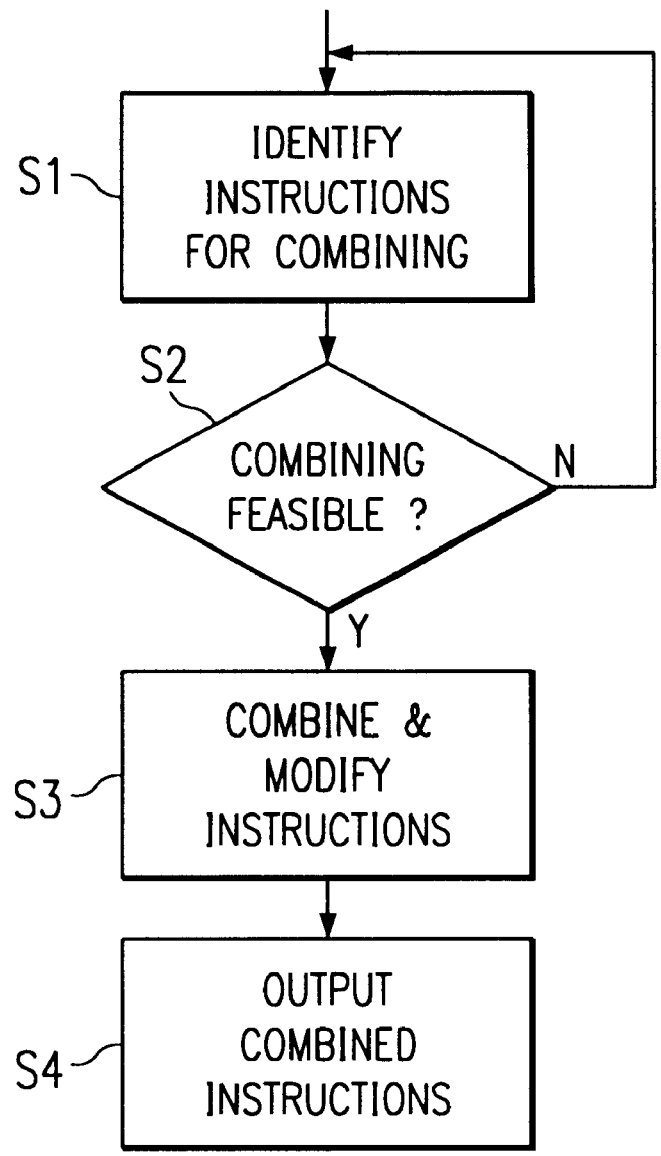
FIG. 12 is a flow diagram of the generation of a soft dual instruction.

FIG. 11 illustrates various steps in transforming two independent instructions into a soft dual instruction.

Two independent instructions 721 and 722 are represented at stage 720.

As shown at 723, a first 24 bit instruction 721 includes an eight bit operation code 724 in the first byte, a single memory (Smem) address 725 in the next byte and data flow bits 726 in the next byte. A second 24 bit instruction 722 includes an eight bit operation code 727 in the first byte, a single memory address 728 in the next byte and data flow bits 729 in the next byte. At 730, the eight operation code bits are each labeled 'O' in the operation code bytes 724 and 727 of each of the instructions. The single memory addresses 725 and 728 are each shown to comprise 7 address bits 'A' plus an indirect/direct indicator bit 'I'. This is because addresses for the standard memory accesses can be either direct or indirect. In the example shown, the granularity is based on bytes. However, in other examples a granularity based on other than 8 bits may be employed.

At stage 735, the operation code 724 of the first instruction is split into two parts. Only seven of the eight bits of the operation code 724 need to be considered. This is as a result of memory code mapping which can ensure that this is redundant in the case of a soft dual instruction. (e.g., by ensuring that all memory instructions have operation codes within a determined range, for example, 80-FF in hexadecimal notation, for a soft dual instruction). As can be seen later in stages 736 and 740, and also in FIG. 10 the operation code for the first instruction is split. Three bits of the operation code for the first instruction are placed between a. soft dual instruction tag 737 and the combined addresses 738 for the first and second instructions and four bits are placed after the combined addresses 738.

At stage 736, the insertion of a soft dual instruction tag 737 is shown. This as a tag which can be interpreted by the decoder as representing a soft dual instruction. Also shown is the merging of the single memory fields 725 and 728. This can be achieved because all soft dual instructions are restricted to indirect addresses, whereby an indirect/direct flag is not needed. The indirect addresses are indicated by a three bit base address XXX or YYY, for the first and second instructions, respectively, and a three bit modifier (MMM). Stage 736 further illustrates the moving of the data flow for the first instruction to the first byte position of the second instruction, with the operation code for the second instruction being moved to the second byte position of that instruction.

As a result, the format of the soft dual instruction represented in FIG. 10 is achieved. It is to be noted that there is no code size penalty for a soft dual instruction versus two single memory access instructions. By replacing two single memory (Smem) instructions by an Xmem, Ymem, enough bits are freed up to insert the 'soft dual' tag 701/737. The soft dual tag by itself allows the decoder to detect that it should decode the pair of instructions as memory instructions. Instruction set mapping can be used to ensure that memory instructions are encoded within a window 80-FF, whereby the most significant bit (bit 7) of the first operation code 724 can be discarded when effecting the dual field encoding.

In the example shown, the various stages illustrated in FIG. 11 are performed by an instruction preprocessor, for example a compiler or an assembler, when preparing instructions for execution. The steps performed by the instruction preprocessor are represented in a flow diagram shown in FIG. 12.

In step S1, the instruction preprocessor detects the presence of two instructions which might potentially be combined into a soft dual instruction. In order for this to be possible, the instructions will need to be such that they may be performed in parallel and do not result in data or control flow anomalies. Each instruction within the instruction set is qualified by DAGEN variables in a DAGEN tag, which define the address generator resources and the type of memory access involved to support the instruction.

Accordingly, in step S2, the instruction preprocessor performs a first step in determining the feasibility of merging two standalone memory instructions into a soft dual instruction by analyzing the DAGEN variables. Assuming this checks out, then the instruction preprocessor is operable to analyze potential bus and operator conflicts and to establish whether there is a potential bar to the combining of the first and second instructions.

In step S3, the instruction preprocessor then applies the soft dual instruction tag 737 and modifies the operation codes and address indications, as well as the field positions as illustrated in FIG. 11.

In step S4, the soft dual instruction is output by the instruction preprocessor.

Figure 13:
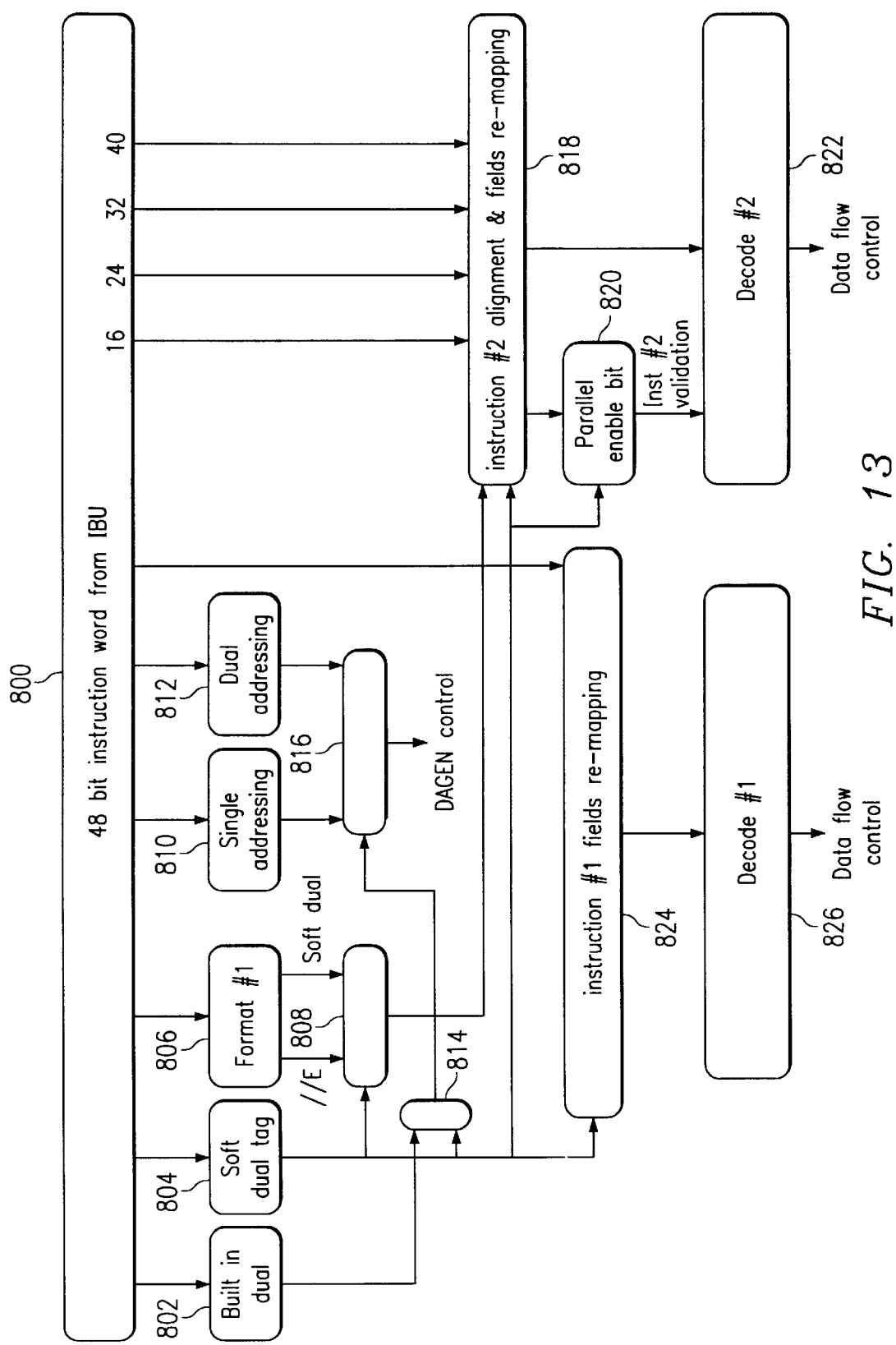
FIG. 13 is a block diagram of a structure for executing a soft dual instruction.

FIG. 13 is a schematic block diagram illustrating the decoding process for a soft dual instruction. FIG. 13 illustrates the decoding of a 48 bit instruction word 800 from the instruction buffer unit 106.

From the operation code (opcode), which is located at the left of the instruction word as shown in FIG. 13, logic 802, 804 in the opcode decoding circuitry is able rapidly to detect whether a built in dual or soft dual instruction is to be decoded. The detection of a soft dual tag by tag decoding logic 804 controls a multiplexor 808 to select either an "E" bit or the soft dual opcodes to be passed from format logic 806 to instruction #2 alignment and. remapping logic 818. Single addressing logic 810 and dual addressing logic 812 are operable. in parallel to commence decoding of the address fields, which are always located at a determined offset from the left hand end of the instruction. Outputs of dual decoding logic 802 and soft dual tag field decoding logic 804 are combined by logic 814 and form a control input to a multiplexor 816. Thus, when a dual instruction is detected, the output of dual addressing logic 812 is passed to the DAGEN control, otherwise the output of single addressing logic 810 is passed to DAGEN control.

As mentioned above, in an alternative form, a compound instruction can comprise a combined DAGEN code field replacing the separate DAGEN codes of the pair of instructions forming the compound instruction. A DAGEN tag in the compound instruction could identify the presence of the combined DAGEN code field, with the decoder being configured to be responsive to the DAGEN tag to decode the combined DAGEN code field. The combined DAGEN code field could form part of the combined address field. The provision of a combined DAGEN field can provide advantages in execution speed.

If the instruction is a soft dual instruction, then remapping is necessary before decoding can be performed. Accordingly, instruction field remapping logic 824 is responsive to the output of the soft dual tag decoding logic 804 to cause the remapping of the information relating to the first instruction of the pair before passing the remapped operation information to decode logic 826 for the first instruction. Similarly, instruction alignment and remapping logic 818 for a second instruction of the instruction pair is responsive to the output of the soft dual tag decoding logic 804 to cause remapping of the information relating to the second memory instruction prior to passing the information to the decode logic 822 for the second instruction. The instruction alignment and field remapping logic 818 is also operable to realign the second instruction dependent upon the format of the first instruction, according to the instruction boundary at bit 16, bit 24, bit 32 or bit 40, as appropriate.

With reference to FIGS. 10 and 13, it can be seen that the decode mechanism shown in FIG. 13 is configured to decode instructions from the instruction buffer. The decode mechanism is responsive to a predetermined tag in a tag field of a soft dual instruction as shown in FIG. 10 to decode a first memory addresses for a first memory instruction and a second memory address for a second memory instruction from a compound address field in the predetermined soft dual instruction.

Parallel enable bit decoding logic 820 is operable to validate whether the second instruction may be decoded and executed in parallel with the first instruction. As a soft dual instruction does not include a parallel enable ("E") bit, this logic 820 is disabled when a soft dual instruction is detected.

Figure 14:
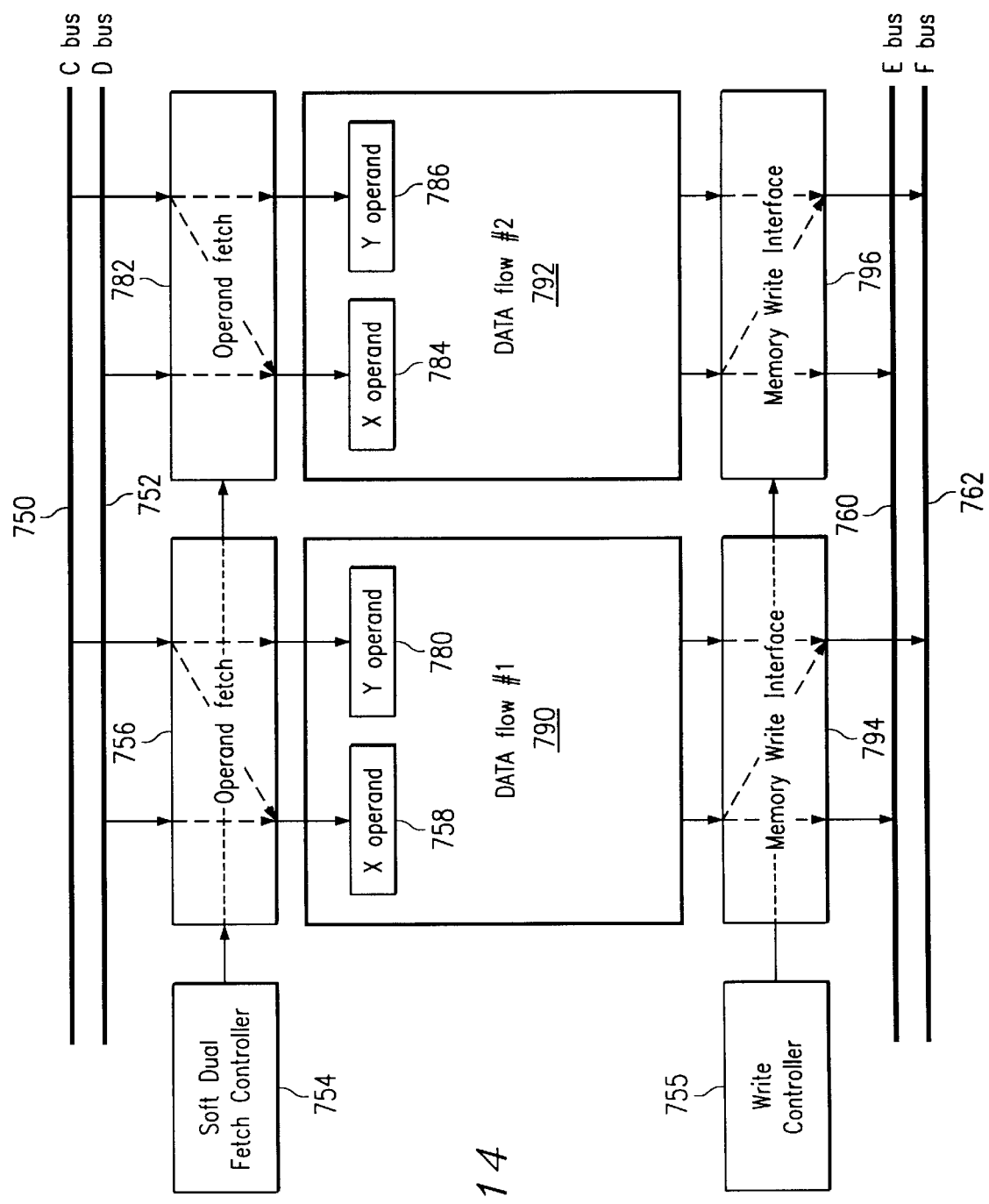
FIG. 14 illustrates memory bus interfacing for a soft dual instruction operation.

FIG. 14 is a schematic block diagram illustrating aspects of the memory bus interfacing for a soft dual instruction, and FIG. 15 is a table summarizing the operand fetch control for a soft dual instruction.

FIG. 14 illustrates the C bus 750, the D bus 752, the E bus 760 and the F bus 762, which busses were referenced earlier, but were not individually identified.

A soft dual fetch controller 754 forms part of the instruction control functions of the processor core 102. This is operable to control operand fetch mechanisms 756 and 782 to fetch X and Y operands 758 and 780 for a first data flow path 790, and X and Y operands 784 and 786 for a second data flow path 792, respectively, via the C and D busses 750 and 752. A soft dual write controller 755, which also forms part of the instruction control functions of the processor core 102, is operable to control memory write interfaces 794 and 796 to control the writing of operands from the first data flow path 790 and the second data flow path 792, respectively to the E and F busses 760 and 762.

The table which forms FIG. 15 illustrates the open and fetch control operations performed by the soft dual fetch controller 754. This illustrates the changes to the operand fetch flow for a soft dual memory instruction compared to a single memory instruction performed standalone. Thus, when a single memory instruction is executed standalone, the operand register is loaded from the D bus, whereby the memory request is a D request, thereby requiring two cycles. However, when a soft dual instruction is executed, the fetch controller changes the operand fetch flow for the Ymem path, such that the request is re-directed to a C request and the operand is fetched from the C bus instead of the D bus as indicated at 1500. Advantageously, operand #1 and operand #2 are fetched in parallel in the same cycle. The same mechanism applies to the write interface. For example, an E bus request can be redirected to an F bus request.

Figure 16:
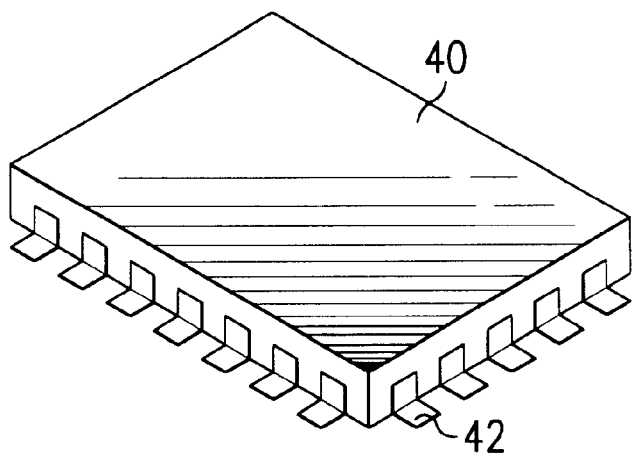
FIG. 16 is a schematic representation of an integrated circuit incorporating the processor of FIG. 1.

FIG. 16 is a schematic representation of an integrated circuit 40 incorporating the processor 10 of FIG. 1. The integrated circuit can be implemented using application specific integrated circuit (ASIC) technology. As shown, the integrated circuit includes a plurality of contacts 42 for surface mounting. However, the integrated circuit could include other configurations, for example a plurality of pins on a lower surface of the circuit for mounting in a zero insertion force socket, or indeed any other suitable configuration.

Figure 17:
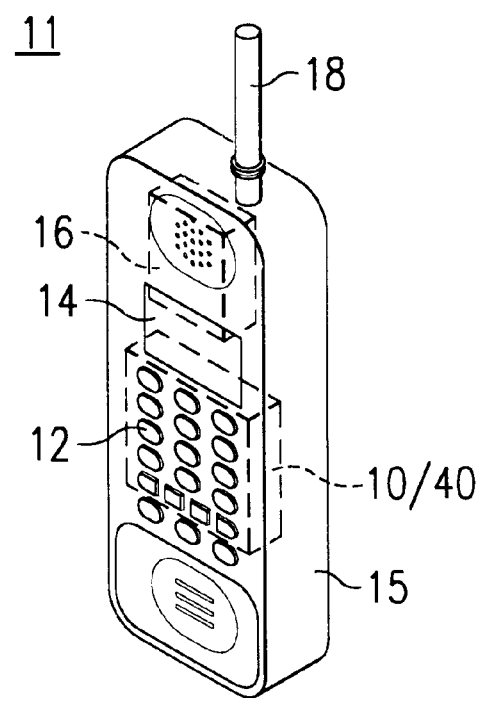
FIG. 17 is a schematic representation of a telecommunications device incorporating the processor of FIG. 1.

One application for a processing engine such as the processor 10, for example as incorporated in an integrated circuit as in FIG. 16, is in a telecommunications device, for example a mobile wireless telecommunications device. FIG. 17 illustrates one example of such telecommunications device. In the specific example illustrated in FIG. 17, the telecommunications device is a mobile telephone 11 with integrated user input device such as a keypad, or keyboard 12 and a display 14 in housing 15. The display could be implemented using appropriate technology, as, for example, a liquid crystal display or a TFT display. The processor 10 is connected to the keypad 12, where appropriate via a keyboard adapter (not shown), to the display 14, where appropriate via a display adapter (not shown), and to a telecommunications interface or transceiver 16, for example a wireless telecommunications interface including radio frequency (RF) circuitry. The radio frequency circuitry could be incorporated into, or separate from, an integrated circuit 40 comprising the processor 10. The RF circuitry 16 is connected to an aerial 18.

Thus, there has been described a processing engine which provides for execution of soft encoded dual memory access instructions. The soft dual instruction mechanism enables execution of two memory access instructions in parallel with high encoding efficiency. Due to increased parallelism, power consumption can be reduced. Also, a decoder for a second instruction can be a subset of the decoder for a first instruction resulting in efficient use of silicon real estate and providing further opportunities for a reduction in power consumption.

As used herein, the terms "applied," "connected," and "connection" mean electrically connected, including where additional elements may be in the electrical connection path.

While the invention has been described with reference to illustrative embodiments, this description is not intended to be construed in a limiting sense. Various other embodiments of the invention will be apparent to persons skilled in the art upon reference to this description. It is therefore contemplated that the appended claims will cover any such modifications of the embodiments as fall within the true scope and spirit of the invention.

What is claimed is:

1. A digital system comprising a processing engine, wherein the processing engine comprises:
   an instruction buffer operable to buffer single and compound instructions pending execution thereof;
   a decode mechanism configured, to decode instructions from the instruction buffer, the decode mechanism being responsive to a predetermined tag in an instruction, the predetermined tag being representative of the instruction being a compound instruction formed from separate programmed memory instructions, to decode at least first data flow control for a first programmed instruction and at least second data flow control for a second programmed instruction; and
   wherein the compound instruction is a compound memory access instruction formed by combining separate first and second programmed memory access instructions such that a compound address field of the compound instruction is formed at the same bit positions as an address field for a hard programmed dual memory instruction and wherein the compound address field is decoded into first and second memory addresses for first and second memory address instructions respectively.

2. The processing engine according to claim 1, wherein the decode mechanism is operable to decode a first memory address for a first programmed memory address instruction and a second memory address for a second programmed memory instruction from a compound memory address field in the compound instruction.

3. The processing engine according to claim 1, wherein the memory addresses in the compound address field of the compound instruction are indirect addresses, the decode mechanism being operable to decode the indirect addresses.

4. The processing engine according to claim 1, wherein the compound instruction comprises a split operation code field for a first programmed instruction of the compound instruction.

5. The processing engine according to claim 4, wherein the decode mechanism is responsive to the predetermined tag to decode a split operation code for the first programmed instruction of the compound instruction.

6. The processing engine according to claim 5, wherein the compound instruction comprises an operation code field for a first programmed instruction of the compound instruction, which operation code field comprises less bits than the operation code field of the first programmed instruction.

7. The processing engine according to claim 6, wherein the decode mechanism is responsive to the predetermined tag to decode a reduced size operation code for the first programmed instruction of the compound instruction.

8. The processing engine according to claim 7, wherein the compound instruction has the same number of bits in total as the sum of the bits of the separate programmed instructions.

9. The processing engine according to claim 1, wherein the compound instruction has a combined data address generation (DAGEN) field formed from DAGEN fields of the first and second programmed memory instructions.

10. The processing engine according to claim 9, wherein the combined DAGEN field forms part of a combined address field.

11. The processing engine according to claim 10, wherein the decode mechanism is responsive to a predetermined DAGEN tag to decode the combined DAGEN field.

12. The processing engine according to claim 1, comprising a fetch controller operable to fetch in parallel first and second operands from addresses identified by the first and second memory addresses, respectively.

13. The processing engine according to claim 12, comprising a write controller operable to write in parallel the result of first and second data flow operations for the first and second programmed instructions, respectively.

14. The processing engine according to claim 1, wherein the decode mechanism is further operable to interpret a single memory access instruction as implicitly capable of parallel execution, whereby the single memory access instruction does not including a parallel enable field.

15. The processing engine according to claim 14, wherein the single memory access instruction is constrained to be a first programmed instruction of a pair of instructions in the instruction buffer.

16. The digital system of claim 1 being a cellular telephone, further comprising:
an integrated keyboard connected to the processor via a keyboard adapter;
a display, connected to the processor via a display adapter;
radio frequency (RF) circuitry connected to the processor; and
an aerial connected to the RF circuitry.

17. The digital system of claim 1, further comprising an instruction preprocessing means for preparing instructions for execution, the instruction preprocessing means being operable to combine separate programmed memory instructions to form a compound memory instruction.

18. A method of improving the performance of a processing engine, the method comprising the steps of:
combining separate first and second programmed memory instructions to form a compound instruction such that a compound address field of the compound instruction is formed at the same bit positions as an address field for a hard programmed dual memory instruction and wherein the compound address field is decoded into first and second memory addresses for first and second memory address instructions respectively, the compound instruction including a tag field containing a predetermined compound instruction tag;
storing the compound instruction in an instruction buffer; and
responding to the predetermined compound instruction tag in the tag field of an instruction in the instruction buffer to decode, from the compound instruction, at least first data control for a first programmed instruction and second data flow control for a second programmed instruction.

19. The method according to claim 18, further comprising the step of decoding at least a first memory address for the first programmed memory instruction and a second memory address for the second programmed memory instruction from a compound address field of the compound instruction.

20. The method according to claim 19, further comprising the step of decoding the compound address field of the compound instruction from the same bit positions as for the address field for a hard programmed dual memory instruction.

21. The method according to claim 19, further comprising the step of fetching in parallel first and second operands from addresses identified by first and second memory addresses, respectively.

22. The method according to claim 21, comprising writing in parallel the result of first and second data flow operations for first and second programmed instructions, respectively, of the compound instruction.

23. The method according to claim 18, further comprising the step of decoding a split operation code for a first instruction of the compound instruction.

24. The method according to claim 18, further comprising decoding a reduced size operation code for the first instruction of the compound instruction.

25. The method according to claim 18, wherein the step of responding comprises decoding a combined data address generation (DAGEN) field formed from DAGEN fields of the first and second programmed memory instructions.

26. The method according to claim 25, wherein the combined DAGEN field forms part of a combined address field.

27. The method according to claim 25, wherein the decode mechanism is responsive to a predetermined DAGEN tag to decode the combined DAGEN field.

28. The method according to claim 18, wherein the step of combining comprises determining whether the separate programmed memory instructions may be combined prior to assembly of the compound instruction.

29. The method according to claim 28, wherein the step of combining further comprises:

determining programmed memory instructions capable of being combined; and combining the determined programmed memory instructions to form a compound memory instruction.

* * * * *